United States Patent [19]

Wilkinson

[11] Patent Number: 4,531,132
[45] Date of Patent: Jul. 23, 1985

[54] METHOD AND APPARATUS FOR THERMALLY PRINTING DATA IN SPECIAL FONTS ON DOCUMENTS LIKE CHECKS

[75] Inventor: Philip J. Wilkinson, Nepean, Canada

[73] Assignee: NCR Corporation, Dayton, Ohio

[21] Appl. No.: 546,131

[22] Filed: Oct. 27, 1983

[51] Int. Cl.³ .............................................. B41J 3/20
[52] U.S. Cl. ............................. 346/76 PH; 400/658; 400/120; 346/1.1
[58] Field of Search ................. 400/120, 26, 44, 48, 400/648, 649, 658; 219/216 PH; 346/76 R, 76 PH, 1.1; 101/93, 93.1, 93.2, 93.3

[56] References Cited

U.S. PATENT DOCUMENTS

| | | | |
|---|---|---|---|
| 3,854,563 | 12/1974 | Cowardin et al. | 400/658 |
| 3,951,247 | 4/1976 | Montanari | 197/1 R |
| 4,000,393 | 12/1976 | Cochran et al. | 219/216 |
| 4,070,680 | 1/1978 | Shelley | 346/76 R |
| 4,145,756 | 3/1979 | Cochran et al. | 364/900 |
| 4,394,092 | 7/1983 | Osmera et al. | 400/120 |

FOREIGN PATENT DOCUMENTS

2117708  8/1983  United Kingdom ............... 400/120

Primary Examiner—E. A. Goldberg
Assistant Examiner—A. Evans
Attorney, Agent, or Firm—Albert L. Sessler, Jr.; Elmer Wargo

[57] ABSTRACT

A thermal printing apparatus including a print station, a transport mechanism for positioning a record medium at the print station, an arcuately-shaped platen, and a line of printing elements. Relative movement between the platen and the printing elements is effected from a common center point. Printing in a variety of styles of fonts like E-13B is possible on documents like checks or deposit slips, for example.

10 Claims, 12 Drawing Figures

METHOD AND APPARATUS FOR THERMALLY PRINTING DATA IN SPECIAL FONTS ON DOCUMENTS LIKE CHECKS

BACKGROUND OF THE INVENTION

This invention relates generally to thermal printing, and more specifically, it relates to a method and apparatus for high-speed, non-impact, thermal printing which provides sufficient resolution to produce specific styles of normal and precision fonts such as E13B, OCR-A, CMC7, and OCR-B, for example, and also for printing on plain paper or documents like checks.

One problem with many prior-art, thermal printers is that they do not provide sufficient definition or resolution of the character printed when compared to laser-xerographic or ink jet technologies.

Another problem with prior-art, thermal printers is that they generally employ specialized thermal paper which has a limited shelf life and is not the record medium of choice for a large number of applications.

Another problem with some prior-art, thermal printers is that they generally employ a feed mechanism which feeds the record medium in a continuous manner past the recording head; this type of feed mechanism is not suitable for printing on record media like checks or deposit slips, for example, where intermittent feeding of the record media to be printed upon is encountered.

Another problem is that some prior-art, thermal printers are not compact and adaptable enough to be incorporated in an encode and sort machine, for example, which is used for printing (in specific styles or fonts, like E13B, for example) on financial documents like checks, for example.

SUMMARY OF THE INVENTION

In a preferred embodiment of the invention, the thermal printing apparatus comprises a print station; means for positioning a record medium at said print station; means for printing on a said record medium positioned at said print station; said means for printing comprising: an arcuately-shaped platen positioned at said print station; a line of printing elements; means for selectively energizing said line of printing elements; and means for providing relative movement between said line of printing elements and said platen from a substantially common center point so as to maintain said line of printing elements in substantial tangential relationship with said platen.

This invention also includes the method of thermally printing data in association with a record medium at a print station including an arcuately-shaped platen and using a line of printing elements which said elements are selectively energizable, comprising the steps of: (a) positioning said record medium at said print station in printing relationship with said line of printing elements and said platen; (b) energizing selected ones of said printing elements to effect at least partial printing of said data on said record medium; (c) providing relative movement between said line of printing elements and said platen from a substantially common center point so as to present said line of printing elements to a portion of said record medium yet to be printed upon; and (d) repeating steps (b) and (c) as necessary to complete the printing of said data.

An object of this invention is to provide a low-cost, low-noise, method and apparatus for printing alphanumeric characters in high resolution fonts such as the various fonts mentioned earlier herein, while printing on plain paper.

Another object of this invention is to produce a printer which is especially suitable for printing the courtesy or monetary amount, for example, on a document like a check in financial transaction machines.

Some advantages of the apparatus of this invention are that it is compact, quiet, and capable of printing in various stylized fonts. Another advantage is that the apparatus may use a thermal transfer ink ribbon which enables printing on plain paper.

These advantages and others will be more readily understood in connection with the following description and drawing.

DETAILED DESCRIPTION OF THE INVENTION

Figure 1:
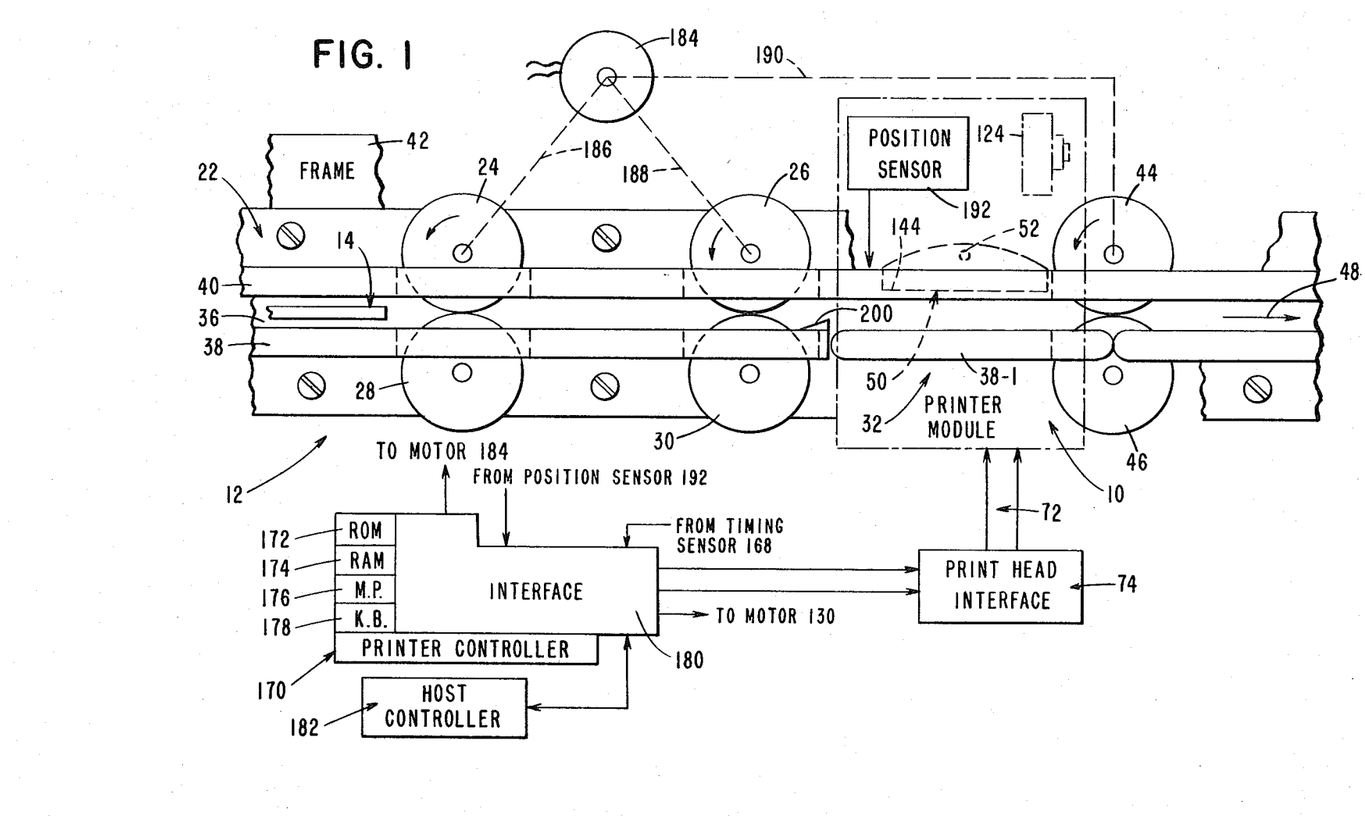
FIG. 1 is a plan view, in diagrammatic form, showing a preferred embodiment of this invention.

FIG. 1 is a plan view, in diagrammatic form of a preferred embodiment of the means for printing or the printer module 10 of this invention as it is incorporated in a business machine such as an encode and sort unit, hereinafter referred to as encoder 12. While the printer module 10 may be used in a variety of printing environments, the encoder 12 is useful to illustrate the advantages of the printer module 10.

Figure 2:
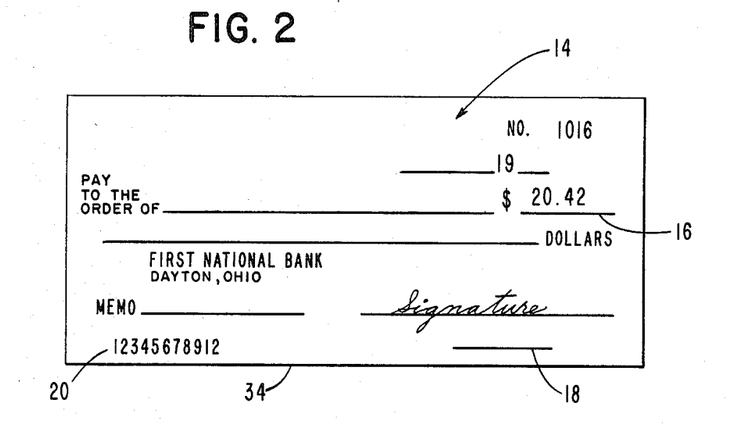
FIG. 2 is a plan view of a document like a check which may be printed upon by the printer module shown in FIG. 1.

As general background information, the encoder 12 is a machine which is used in the banking industry to process documents such as checks, like check 14 shown in FIG. 2. During the processing of checks at a bank, for example, a point is reached at which the monetary or courtesy amount 16 of the check is printed on the check itself. Generally, the courtesy amount 16 is printed under the signature along line 18 thereon. In the USA and a number of other countries, the checks have magnetic ink character recognition (MICR) data printed thereon according to an E-13B font, for example. This MICR data 20 on the check 14 includes, for example, the account number, check number, and bank number. In the embodiment described, the printer module 10 is utilized to print the courtesy amount 16, typically along line 18 of documents like check 14 in MICR ink and in a stylized font like E-13B, for example; however, it can also be used to print MICR data 20.

The printer module 10 is shown in dashed outline in FIG. 1 so as to orient it in relation to the encoder 12. The encoder 12 includes a document track 22 and transport rollers such as 24 and 26 which cooperate with associated pinch rollers 28 and 30, respectively, to provide a means for moving a document like check 14 to a print station 32 in the encoder 12. The top edge of the check 14 is seen in FIG. 1, and it is fed on its lower edge 34 (FIG. 2), with the lower edge 34 gliding over the trough portion 36-1 (FIG. 7) of track 22 which also includes the vertical side walls 38 and 40. These side walls 38 and 40 are secured to the frame 42 (shown diagrammatically) and are spaced apart to receive the documents therebetween and to guide a document like check 14 to the print station 32 where the printing module 10 is located. The printing module 10 is then utilized to print the courtesy amount 16 on the associated check 14 as previously described. After printing, the document 14 is moved from the print station 32 by drive roller 44 and its associated pinch roller 46 and moved in the downstream direction shown by arrow 48 to other elements not important by an understanding of this invention. When printing more than the courtesy amount on a particular check 14, the check 14 may be advanced, slightly, in the direction of arrow 48 to print, for example, the MICR data 20 on the document like check 14.

Figure 3:
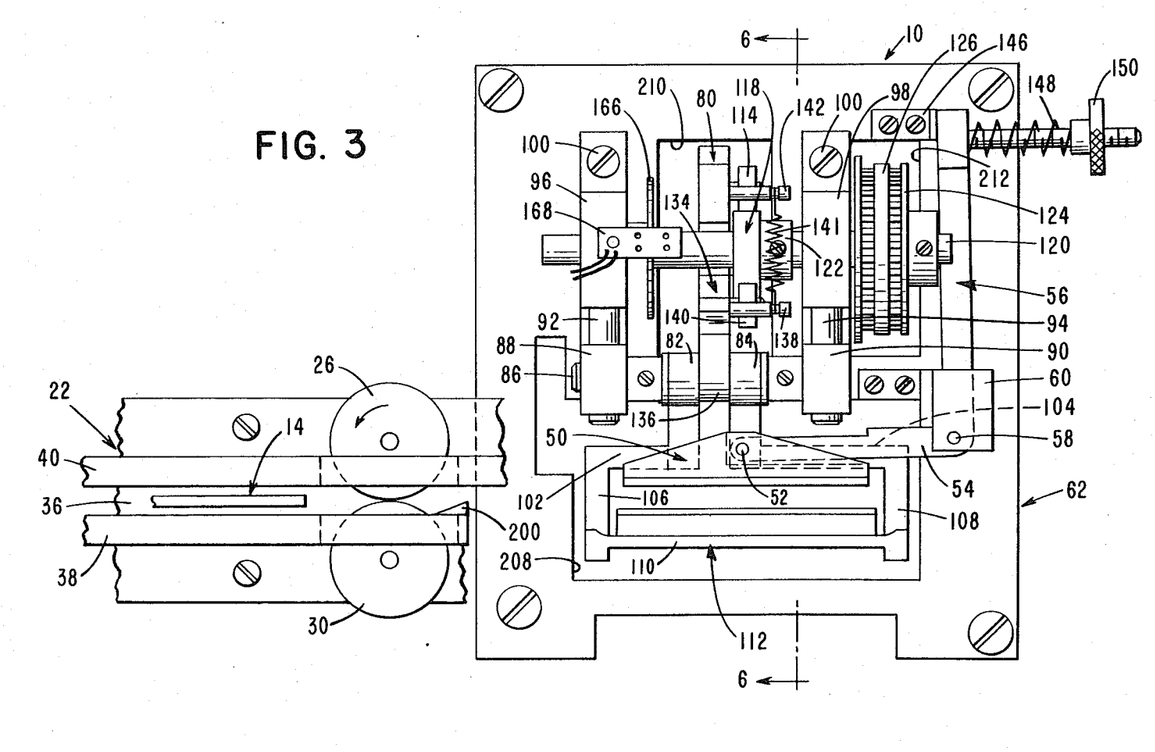
FIG. 3 is a plan view of the printer module shown in FIG. 1.
Figure 4:
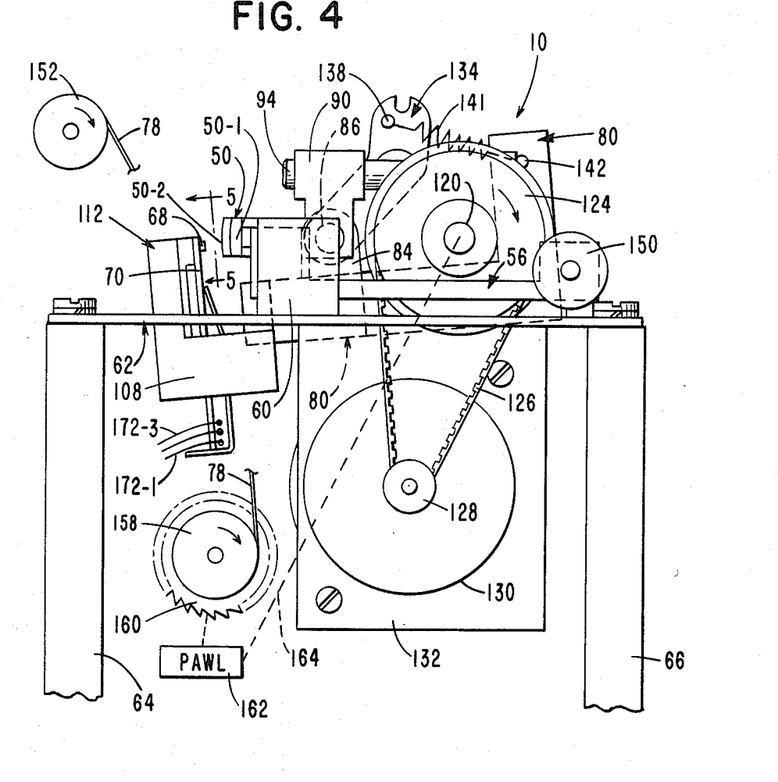
FIG. 4 is a side view in elevation of the printer module shown in FIGS. 1 and 3.

The printer module 10, shown only in dashed outline in FIG. 1, is shown in more detail in FIGS. 3 and 4, with a portion of the document track 22 being shown in FIG. 3 to orient the reader. The printer module 10 includes a platen 50 which is pivotally supported on a pin 52 which is located in one end 54 of an "L"-shaped lever 56 which, in turn, is pivotally mounted on a pin 58 located in a block 60 secured to a plate 62. Plate 62 is fastened to four vertically-oriented, support posts, for example, like posts 64 and 66 (shown in FIG. 4), or the plate 62 may be secured to the frame 42 (FIG. 1) of the encoder 12.

Figure 5:
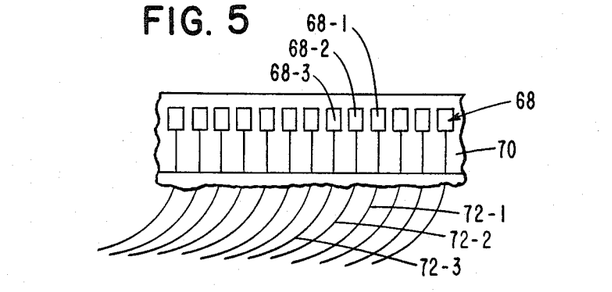
FIG. 5 is a view taken along the line 5—5 of FIG. 4 to show additional details of the line of printing elements associated with the print head.

The printer module 10 also includes a line of printing elements 68 (FIG. 4) which are positioned on a ceramic, print head support 70. Each of the discrete elements like 68-1 (FIG. 5), 68-2, and 68-3, for example, has its own energizing lead like 72-1, 72-2, and 72-3, respectively, connected to a conventional print head interface 74 shown in FIG. 1, with these energizing leads being shown collectively as 72 in FIG. 1. In the embodiment described, each discrete element like 68-1, for example, has a width (as viewed in FIG. 5) of 145 microns and a height of 165 microns with a spacing between adjacent elements of 20 microns measured along the line of printing 68; this is equal to a printing density of 6.06 dots per millimeter as measured along the line of printing 68. In the embodiment described, fourteen discrete elements like 68-1, 68-2, etc., are allocated to print the width of a character, with the width being measured horizontally as viewed in FIG. 5, and eighteen indexing steps are allocated to present the line of elements 68 to a new area of the record medium like check 14, as by indexing vertically as viewed in FIG. 5, to complete the height of a character. Thus, an individual character to be printed is printed within a 14×18 matrix; this matrix, having the printing density mentioned, permits printing in sufficient resolution to print in the various specialized fonts like E-13B, for example, mentioned earlier herein. Naturally, dimensions other than those just given can be utilized in the printer module 10.

The printer module 10 also includes a means 76 (FIG. 6A, for example) for providing relative movement between the line of printing elements 68 and the platen 50 so that the line of printing elements 68 is substantially in tangential relationship with the platen 50 to effect printing. The means 76 for providing the relative movement is shown best in FIGS. 6A, 6B, 6C, and 6D. While certain portions of the printer module 10 are left out of the FIGS. 6A–6D, to simplify these figures, FIG. 7 is included to show the relationship of a record medium like document 14, and a printing ribbon like 78 at the printer module 10.

Figure 6A:
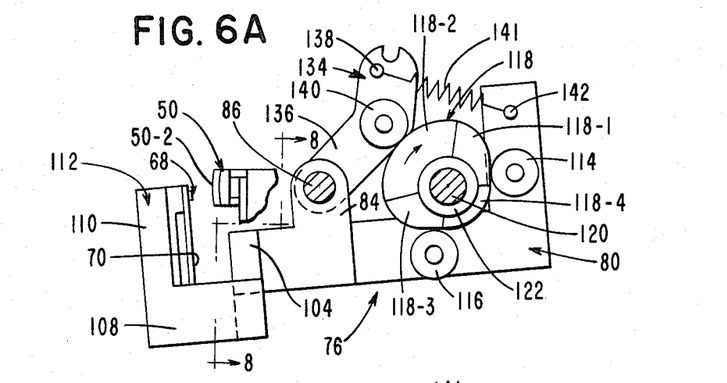
FIG. 6A is a cross-sectional view taken along the line 6—6 of FIG. 3 and shows a means for providing relative movement between the line of printing elements shown in FIG. 5 and the platen, with this means being shown in a home position.
Figure 7:
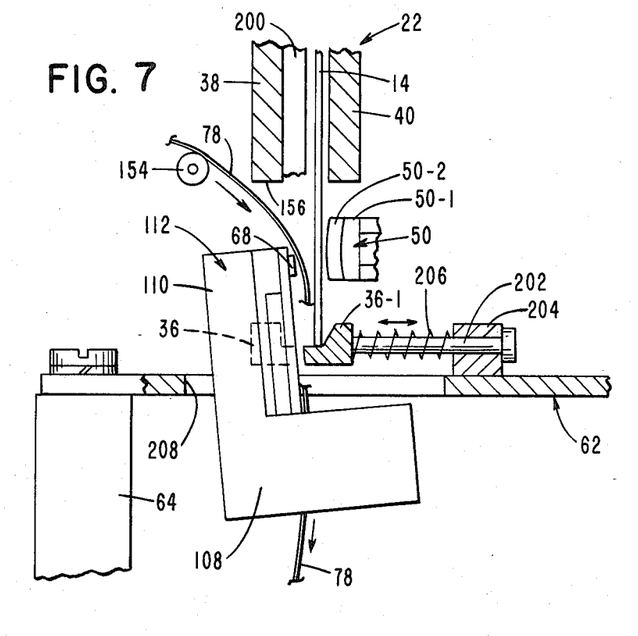
FIG. 7 is a general cross-sectional view, taken along a line similar to 6—6 to show additional details of the printer module.

FIG. 6A shows the means 76 in a home position in which the line of printing elements 68 is spaced from the platen 50 to permit the insertion of a record medium and thermal transfer ribbon therebetween.

Figure 6B:
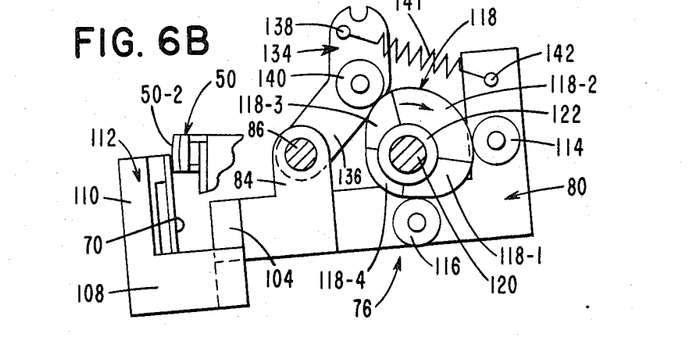
FIG. 6B is a view similar to FIG. 6A, showing the line of printing elements in operative engagement with the platen when printing is about to start.

FIG. 6B shows the means 76 at the start of the printing operation in which the line of printing elements 68 is in operative relationship with the platen 50.

Figure 6C:
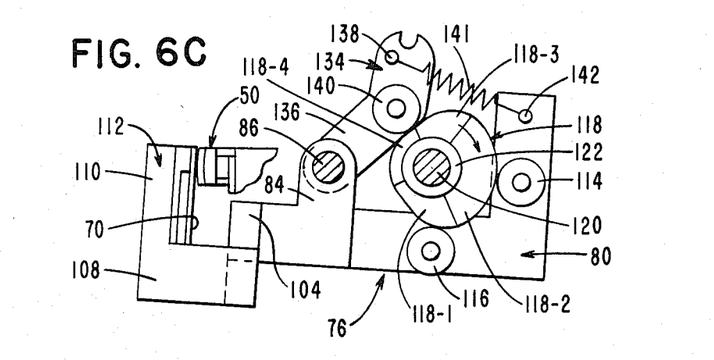
FIG. 6C is a view similar to FIG. 6A, showing the line of printing elements near the completion of printing.

FIG. 6C shows the means 76 at the finish of the the printing operation.

Figure 6D:
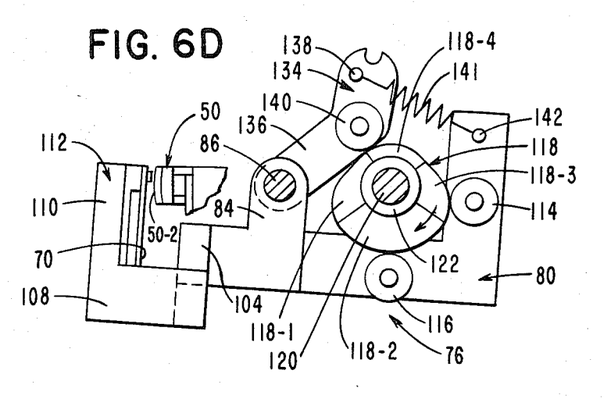
FIG. 6D is a view similar to FIG. 6A, showing the line of printing elements being moved out of operative engagement with the platen.

FIG. 6D shows the means 76 in the process of returning to the home position. A record medium and a ribbon, when necessary, are not shown in order to simplify the FIGS. 6A–6D.

The means 76 for providing relative movement between the line of printing elements 68 and the platen 50 (FIGS. 6A, 3, and 4) includes a first lever or the "L-shaped lever 80 having extended portions 82 and 84 (FIG. 3) which are pivotally secured to a rod 86. The rod 86 is secured in bushings 88 and 90 (FIGS. 3 & 4), with bushing 88 being slidably mounted on a stationary rod 92 and bushing 90 being similarly, slidably mounted on a stationary rod 94. The rods 92 and 94 are positioned in a horizontal direction, as viewed in FIG. 4, and these rods extend from the vertical supports 96 and 98 which are shown best in FIG. 3. The supports 96 and 98 are secured to the plate 62 by fasteners 100. By the construction just described, the "L-"shaped lever 80 is pivotally mounted on the rod 86, and the rod 86, which forms the pivot point for lever 80, is reciprocatably moveable in a horizontal direction along rods 92 and 94, as viewed in FIG. 4, by means to be described hereinafter.

Figure 8:
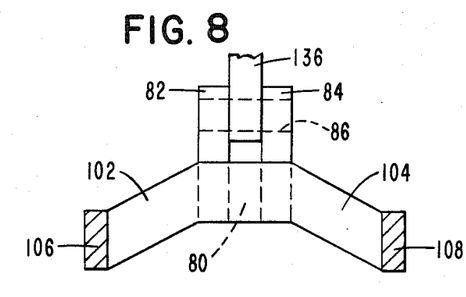
FIG. 8 is a cross-sectional view, taken along the line 8—8 of FIG. 6A to show additional details of the means for mounting the line of printing elements.

The "L"-shaped lever 80 (FIGS. 6A and 3) also includes the outwardly extending portions 102 and 104 (best shown in FIG. 8). These portions 102 and 104 are joined, respectively, to portions 106 and 108. Portions 106 and 108 are integrally formed with an inverted "U"-shaped section 110 (FIG. 3) which completes a rectangular frame designated generally as 112 which supports the ceramic support 70 on which the line of printing elements 68 is mounted.

The "L"-shaped lever 80 (FIG. 6A) has cam followers or rollers 114 and 116 rotatably mounted thereon and spaced apart as shown, and these rollers cooperate with a second lever means including the cam designated generally as 118 to move the lever 80 as will be described hereinafter. The cam 118 is fixed to the shaft 120 by a locking collar 122 to rotate therewith. The shaft 120 is rotatably mounted in the supports 96 and 98 (FIG. 3), and the shaft 120 is rotated by a pulley 124. In the embodiment described, the pulley 124 is rotated by a timing belt 126 which is coupled to the output driving pulley 128 of a stepping motor 130 (FIG. 4) which is secured to the printer module 10 by a support plate 132. One complete rotation of pulley 124 causes the cam 118 to rotate through 360 degrees, and one rotation of cam 118 causes the line of printing elements 68 to move relatively with regard to platen 50 from the home position shown in FIG. 6A through the positions depicted by FIGS. 6B, 6C, and 6D back to the home position shown in FIG. 6A.

Before discussing the rotation of cam 118, it appears appropriate to discuss a third lever means including an arm 134 (FIGS. 3, 4, 6A) which also coacts with the cam 118. The arm 134 has one end 136 thereof pivotally mounted on the shaft 86, and the remaining end thereof has a pin 138 extending therefrom. The arm 134 also has a roller 140 mounted thereon to engage the periphery of cam 118. A tension spring 141, having one end secured to the pin 138 on the arm 134 and the remaining end secured to a pin 142, extending from the "L"-shaped lever 80, is used to keep the periphery of cam 118 in operative engagement with the rollers 114 and 116 as one of its functions. The cam 118 (FIGS. 6A-6D) is divided into four general sectors, namely, a rise sector 118-1, a first dwell sector 118-2, a fall sector 118-3, and a second dwell sector 118-4, with the first dwell sector 118-2 having a larger radius of curvature than the second dwell sector 118-4, and with these sectors blending into one another as shown to provide a smooth continuous action as the cam 118 is rotated.

Before discussing the operation of the cam 118, it appears appropriate to discuss some additional elements associated with the printer module 10 and the encoder 12.

The platen 50 (FIG. 4), alluded to previously herein, comprises a steel backing platen 50-1 with a cast urethane surface 50-2 of about 0.100 inch in thickness bonded thereon. The platen 50 is pivotally mounted on the pin 52 (FIG. 3) to enable the line of printing elements 68 to provide operative even contact pressure along the length of the platen 50 during printing. A small, slight-force, torsion spring, not shown but positioned around pin 52, may be used to bias the platen 50 in a clockwise direction (as viewed in FIG. 1) so as to keep the upstream edge 144 of the platen 50 out of the document track 22 of prevent a document 14 from abutting thereagainst when entering the printer module 10. The lever 56, which pivots on pin 58 (FIG. 3), is biased against an adjustable stop 146 by a spring 148 whose compression may be adjusted by the adjustment nut 150. When the line of printing elements 68 engages the platen 50 in operative relationship therewith, the lever 56 is pivoted about pin 58 in a clockwise direction as viewed in FIG. 3, and is biased against the spring 148 to establish an adjustable, set load between the line of printing elements 68 and the platen 50.

The printer module 10 also includes a supply reel 152 (FIG. 4) to supply the ribbon 78 thereto. From the reel 152, the ribbon 78 passes over an idler roller 154 (FIG. 7), through an opening 156 in the side wall 38 of the document track 22, between the line of printing elements 68 and the check 14, between the portions 106 and 108 (FIG. 3) associated with the frame 112, and thereafter, the ribbon 78 is wound up on the take-up reel 158 (FIG. 4). The take-up reel 158 is incrementally rotated in a clockwise direction, as viewed in FIG. 4 by a conventional, ratchet wheel 160 and a pawl 162 which is operatively coupled to the shaft 120 by conventional linkage shown as dashed line 164. In the embodiment described, when the cam 118 is rotated one revolution by the stepping motor 130 to print one line of printing, the linkage 164, pawl 162 and ratchet wheel 160 will advance the ribbon 78 more than the height of a line of printing to ensure that an unused portion of the ribbon 78 is presented for the next printing.

The printer module 10 also includes a slotted, timing disc 166 (FIG. 3) which is fixed to the shaft 120 to rotate therewith. A conventional, timing sensor 168 which includes a source of light and a light responsive cell is positioned in operative relationship with the timing disc 166 so as to provide at least a "home position" signal to the printer controller 170 shown in FIG. 1. The angular rotation of the timing disc 166 may provide position-location information with regard to the cam 118 (FIGS. 6A-6B) and the stepping motor 130 if necessary or desirable.

The printer controller 170 (FIG. 1) is conventional and does not form a part of this invention. The necessary instructions for operating the printer module 10 may be stored in the read only memory (ROM) 172, or they may be loaded daily into the random access memory (RAM) 174 from some supplemental storage like a tape or disc file (not shown). A microprocessor (MP) 176 is used to process the instructions, and a keyboard (KB) 178 is used to make selections as to the type of font to be used for printing and to control the printer module 10. An interface 180 is used to provide interconnections among the various components shown and to also interface the printer controller 170 with the host controller 182 associated with the encoder 12 or some host system (not shown).

The encoder 12 (FIG. 1) also includes a stepping motor 184 to drive or rotate the transport rollers 24, 26, and 44 by suitable linkage such as timing belts which are shown as dashed lines 186, 188, and 190, respectively. As a document or check 14 is driven along the track 22 by the transport rollers 24 and 26, it approaches the printer module 10 to be printed upon in the embodiment described. A conventional position sensor 192 detects the leading edge of the check 14 as it approaches the printer module 10, and the output of the sensor 192 is used by the printer controller 170 to deenergize the stepping motor 184 to stop the check 14 so that it is in printing relationship with the line of printing elements 68 and the platen 50. The position of the position sensor 192 shown in FIG. 1 is selected to simplify the drawing; however, its actual location is dependent upon the type of document or check to be printed upon and where the printed data is to occur on the check itself, for example. Another point to be made is that as the check 14 approaches the printer module 10, it is deflected by a ramp 200 (FIG. 1) which is located in the document track 22 and which tends to deflect the check away from the line 68 of printing elements and the opening 156 in the side wall 38; this aspect is shown more clearly in FIG. 7 in which the check 14 is located more closely to side wall 40 (and platen 50) than it is to side wall 38. The reason for this will become apparent from an explanation of the relative movement of the line of printing elements 68 and the platen 50 during printing. For the moment, it is sufficient to state that as the line of printing elements 68 and the frame 112 move towards the platen 50 (FIG. 7), if the trough portion 36 of the document track 22 were stationary (as shown in dashed outline), it would prevent the line of elements 68 from moving into operative engagement with platen 50. The trough portion of the track 22 (shown in solid outline) is referenced as 36-1 in FIG. 7, and this portion 36-1 has a length which is longer than the length of the platen 50 as measured along the length of the track 22. The trough portion 36-1 is supported on spaced plungers 202 (only one shown in FIG. 7) which are slidably mounted in associated bushings 204 fixed to the support plate 62, for example. Springs like 206, for example, bias the trough portion 36-1 to the left, as viewed in FIG. 7, so as to support the lower side of the check 14 when it is deflected towards the side wall 40 by the ramp 200. When the line of printing elements 68 and the frame 112 move towards the platen 50, the trough portion 36-1 is moved to the right (as viewed in FIG. 7) to enable the line of printing elements 68, the ribbon 78, the check 14, and the platen 50 to move into operative, printing relationship with one another. The support plate 62 has suitable openings like 208 (FIG. 7), 210 and 212 (FIG. 3) to permit the various elements like the "L"-shaped lever 80, drive pulley 124, etc. to pass therethrough when necessary.

Having discussed the details of the components of the encoder 12 and the printer module 10, it appears appropriate to discuss the operation of both. As earlier stated, the function of the printer module 10 in the embodiment described is to print, for example, the courtesy amount 16 (FIG. 2) of a check 14 on line 18 thereof. The data to be printed on line 18 of a check is obtained from the host controller 182, for example, and forwarded to the printer controller 170 (FIG. 1). If the data to be encoded or printed is to be printed in an E13-B font, for example, a thermal transfer ribbon 78 containing the appropriate magnetic ink would be loaded in the printer module 10. An operator then selects the E13-B font on the K.B. 178 and the appropriate decoder (not shown) is selected by the printer controller 170 to translate the data to be printed into the necessary energizing pattern to energize the line of printing elements 68 to effect the printing. In the embodiment described, the printer module 10 prints up to 16 characters on line 18 (FIG. 2), with 4 of the 16 characters relating to the "transit routing" associated with checks, and with the remaining 12 positions relating to the courtesy amount 16 and its associated characters. The line of printing elements 68 is energized so as to complete the "matrix of dots" associated with the line 18 of characters by starting from the bottoms of the characters on a line of characters and by working towards the tops of the characters on the line.

When the printing operation is to start, a document like 14 is fed along the track 22 (FIG. 1), detected by the position sensor 192, and stopped in printing position by deenergizing the stepping motor 184 as previously described.

With the check 14 in position, the stepping motor 130 (FIG. 4) is energized in stepping fashion by the printer controller 170. The stepping motor 130 then begins to incrementally rotate the cam 188 in a clockwise direction as viewed in FIGS. 6A-6D as previously explained. In the embodiment described, the stepping motor 130 is incrementally stepped 144 times in order to effect one complete revolution of the cam 118, although this number may be changed for different applications.

Starting with the line of printing elements 68 and the platen 50 in the home position shown in FIG. 6A, the first 36 of the 144 indexes mentioned incrementally rotate the cam 118 through 90 degress of rotation to the approximate position shown in FIG. 6B. In FIG. 6B, the line of printing elements 68, the ribbon 78, the document like check 14, and the platen 50 are brought into operative engagement. When the cam 118 rotates from the position shown in FIG. 6A, the rise sector 118-1 of the cam 118 pushes the roller 114 which pushes the "L"-shaped lever 80 to the right, as viewed in FIG. 6A. The rise sector 118-1 of cam 118 is designed to have a constant acceleration section leading to a linear velocity section which is then followed by a constant deceleration section which blends in with the periphery of the first dwell sector 118-2. The fall sector 118-3 has a profile which is the mirror image of rise sector 118-1. Also, during the first 36 indexes mentioned, the second dwell sector 118-4 engages the roller 116 and produces a dwell; in other words the "L"-shaped lever 80 is not pivoted. The motion of the line of printing elements 68 during the first 36 indexes mentioned is represented by arrow 214 in FIG. 9 which figure represents an exaggerated "trace" of the motion of line of printing elements 68 relative to the platen 50. When the "L"-shaped lever 80 moves to the right, as viewed from FIG. 6A, for example, rod 86 also moves to the right; this is due to the fact that rod 86 (FIG. 3) is supported in bushings 88 and 90 which are slidably mounted on rods 92 and 94, respectively.

Figure 9:
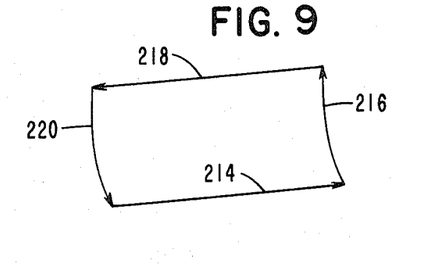
FIG. 9 is a diagrammatic view of the motion of the line of printing elements for one complete cycle of operation.

During the second group of 36 indexes out of the 144 indexes mentioned for a complete revolution of the cam 118 (FIGS. 6B, 6C), the line of printing elements 68 travels in an arcuate plane represented by arrow 216 in FIG. 9. The pivot point for the line of printing elements 68 at this time is the longitudinal axis of the rod 86. The curvature of the platen 50 is designed so that it has the same radius of curvature (from the longitudinal axis of rod 86) as the motion of the line of printing elements 68 when they are in operative engagement with the platen 50. To effect the motion indicated by arrow 216 in FIG. 9, the rise sector 118-1 of the cam 118 engages the roller 116 to pivot the "L"-shaped lever 80 about the longitudinal axis of rod 86 in a clockwise direction, as viewed in FIG. 6B. During this second group of 36 indexes, the first dwell sector 118-2 engages the roller 114 to keep the line of printing elements 68 in engagement with the platen 50. Also, during the first 9 indexes of the second group of 36 indexes, no printing takes place; during the next 18 indexes, printing takes place; and during the last 9 indexes, no printing takes place. It should be recalled that in the specific embodiment described, an individual character is formed in a 14×18 matrix of "dots" which means that 18 steps or indexes are required to complete the printing of one full character height of data. The first 9 and the last 9 indexes of the second group of 36 indexes are utilized for general preparation to allow the line of printing elements 68 and the platen 50 "to settle" and insure good operative contact prior to energization of the elements 68 for printing. Printing during the 18 steps or indexes mentioned occurs on the linear velocity section of rise sector 118-1 of cam 118 as mentioned earlier herein so as to provide equal spacing in a vertical direction when completing a full character height.

During the third group of 36 indexes out of the 144 indexes mentioned for a complete revolution of the cam 118, the line of printing elements 68 travels in the direction represented by arrow 218 in FIG. 9. To effect this motion, the fall sector 118-3 of cam 118 is in operative engagement with roller 114 (FIG. 6D) due to the urging of arm 134 and spring 141 which effectively pull the "L"-shaped lever 80 to the left as viewed in FIG. 6D; there is no pivoting of lever 80 at this time because the first dwell sector 118-2 is in engagement with the roller 116. Notice that as the "L"-shaped lever 80 is pulled to the left (FIG. 6D) the longitudinal axis of rod 86 is also moved away from the shaft 120 (FIG. 3); rod 86 is mounted for reciprocal movement on rods 93 and 94 as previously explained.

During the fourth group of 36 indexes out of the 144 indexes mentioned for a complete revolution of cam 118, the line of printing elements 68 travels in the direction represented by arrow 220 in FIG. 9. To effect this motion, the fall sector 118-3 of cam 118 engages the roller 116, permitting the arm 134 and the spring 140 to pivot the "L"-shaped lever 80 about the longitudinal axis of rod 86 in a counter-clockwise direction as viewed in FIG. 6D to return the line of printing elements 68 to the home position shown in FIG. 6A. The relative positions of rollers 114, 116, and 140 with regard to the cam 118 are such as to provide a "home position" in conjunction with spring 141, which spring 141 is subjected to minimum tension when the cam 118 is in the home position.

After the cam 118 is incrementally indexed 144 times to effect one complete revolution thereof, the line of printing on line 18 (FIG. 2) of the check 14 is completed. The printer controller 170 then energizes the stepping motor 184 (FIG. 1) to rotate the transport rollers 26 and 44 to move the check 14 downstream along the direction of arrow 48. During the time that the line of printing elements 68 is moving along the direction of arrow 220 in FIG. 9, the pawl 162 indexes the ratchet wheel 160 (FIG. 4) to move the ribbon 78 slightly more than the height of one character or one line of printing so as to present fresh ribbon to the print station for the next line of printing. During the time of printing, the pressure of the line of printing elements 68 against the platen 50 tends to prevent the check 14 from creeping up as the line of printing elements 68 moves along the direction of arrow 216 in FIG. 9. In this regard, the layer 50-2 of plastic urethane has a coefficient of friction which is greater than the coefficient of friction of the line of printing elements 68. The check 14 is removed from the print module 10 by the transport roller 44 and the process just described is repeated for the next check to enter the module 10.

In the embodiment described, one rotation of the cam 118 takes place in approximately 300 milliseconds, thereby providing a printing rate of about 200 documents per minute. The printer module 10 is also very quiet, meeting European noise standards of 65 dB. The document track 22 (FIG. 1) may include a removable section 38-1 of side wall 38 to facilitate maintenance of the printer module 10. While the printer module 10 is used in an encoder 12 which automatically positions a check 14 at the print station 32, the printer module 10 may also be used, for example, in an encoder which employs a "hand drop" at the print station 32.

What is claimed is:

1. A method of thermally printing data in association with a record medium at a print station including an arcuately-shaped platen and using a line of printing elements which said elements are selectively energizable, comprising the steps of:
   (a) positioning said record medium at said print station in printing relationship with said line of printing elements and said platen;
   (b) energizing selected ones of said printing elements to effect at least partial printing of said data on said record medium;
   (c) providing relative movement between said line of printing elements and said platen from a substantially common center point so as to present said line of printing elements to a portion of said record medium yet to be printed upon; and
   (d) repeating steps b and c as necessary to complete the printing of said data; said step c being effected by pivoting said line of printing elements about said common center point with regard to said platen which is stationary; and
   (e) moving said line of printing elements away from said platen and in a direction essentially perpendicular to said record medium at the completion of said printing of data by shifting said common center point.

2. A thermal printing apparatus comprising:
   a print station;
   means for positioning a record medium at said print station;
   means for printing on a said record medium positioned at said print station;
   said means for printing comprising:
   an arcuately-shaped platen positioned at said print station;
   a line of printing elements;
   means for selectively energizing said line of printing elements; and
   means for providing relative movement between said line of printing elements and said platen from a substantially common center point so as to maintain said line of printing elements in substantial tangential relationship with said platen;
   said providing means comprising:
   first lever means for supporting said line of printing elements with regard to said common center point; and
   said lever means cooperating with said first lever means to pivot said line of printing elements to provide said relative movement.

3. The apparatus as claimed in claim 2 in which said providing means further comprises a third lever means cooperating with said second lever means to enable said line of printing elements to be moved away from and towards said platen by shifting said common center point.

4. The apparatus as claimed in claim 3 in which said second lever means includes a cam line and means for rotating said cam line in timed relationship with said means for selectively energizing said line of printing so as to effect said printing on said record medium.

5. The apparatus as claimed in claim 4 in which said arcuately-shaped platen has a radius of curvature whose center lies at said common center point when said line of printing elements is in said substantial tangential relationship with said platen.

6. The apparatus as claimed in claim 5 in which said platen is stationary and said line of printing elements is moved in a curved surface having the same radius of curvature as said platen when said printing elements are in said substantial tangential relationship with said platen.

7. The apparatus as claimed in claim 6 in which said means for printing further comprises means for supplying a thermally-responsive ribbon to said print station.

8. The apparatus as claimed in claim 7 in which said means for positioning a record medium at said print station includes a track having a moveable section located at said print station; said movable section being moved by said means for printing when said line of printing elements is moved towards said platen to enable said line of printing elements to be in said substantial tangential relationship with said platen.

9. The apparatus as claimed in claim 8 in which said line of printing elements has a density concentration of 6.06 printing elements per millimeter.

10. The apparatus as claimed in claim 8 in which said line of printing elements has a density of concentration which enables said means for printing to print in a specialized font like E-13B when the associated thermally responsive ribbon includes magnetic ink which is transferred to said record medium during said printing.

* * * * *